Patented Oct. 16, 1928.

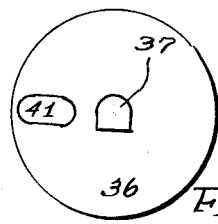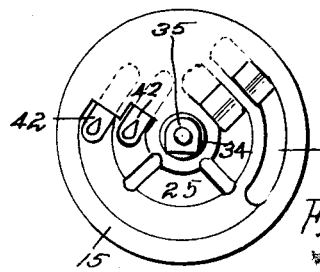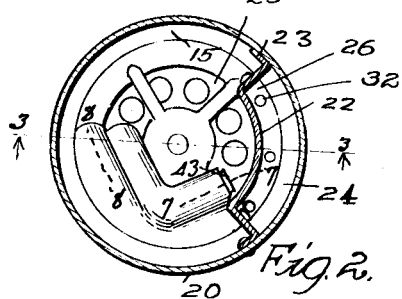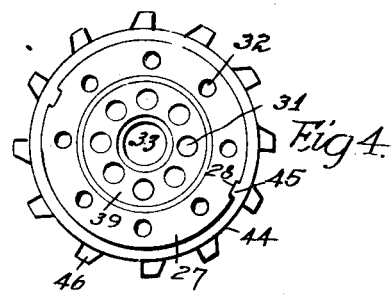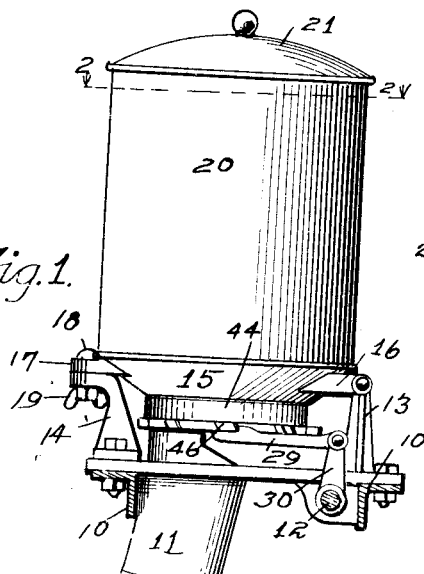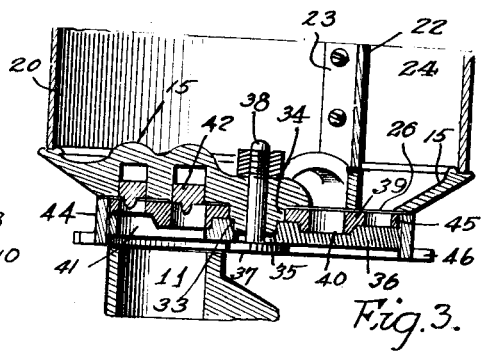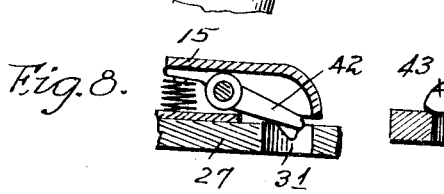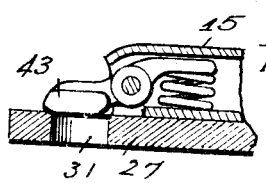

1,688,067

UNITED STATES PATENT OFFICE.

RICHARD V. BARRY, OF OTTUMWA, IOWA.

SEED DROPPER.

Application filed February 16, 1927. Serial No. 168,645.

The object of my invention is to provide a seed dropping attachment for corn planters of durable, simple and inexpensive construction, adapted to simultaneously plant a number of different kinds of seed, and in connection therewith, means whereby a predetermined number of each kind of seeds may be automatically planted in each hill.

More specifically it is the object of my invention to provide in a seed dropping attachment for corn planters a seed box divided into a number of independent compartments, and in connection therewith a single movable member for delivering from each of the compartments a predetermined number of seeds to the dropping mechanism, in connection therewith means whereby the said delivering means may be easily and quickly changed to vary the number of seeds dropped in each hill.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved seed dropping attachment.

Figure 2 is a detail sectional view taken on the line 2—2 of Figure 1.

Figure 3 is a vertical sectional view taken through the lower portion of the seed box and the dropping mechanism.

Figure 4 is an inverted view of the seed plate.

Figure 5 is an inverted plan view of the bottom plate of the seed box.

Figure 6 is a bottom view of the bearing plate on which the seed plate rotates.

Figure 7 is a detail sectional view taken on the line 7—7 of Figure 2.

Figure 8 is a detail sectional view taken on the line 8—8 of Figure 2.

The numeral 10 indicates the runner frame of a corn planter which is provided with a dropping spout 11 of the usual construction. A dropper shaft 12 is also provided in said frame. Supported on one side of the frame 10 is a bracket 13, while on the other side of the frame 10 is a bracket 14. The brackets 14 and 13 carry the bottom plate 15 of the seed box which is circular and somewhat dished. Hinge members 16 are attached to the plate 15 and are pivotally mounted to the upper end of the bracket 13. The opposite side of the plate 15 is provided with a lug 17 which carries a bolt 18, by means of which the plate 15 is clamped in a horizontal position. The bolt 18 is provided with a thumb nut 19, so that the said bolt may be quickly removed, after which the plate 15 may be swung to an inverted position if so desired.

Mounted upon the plate 15 is a cylindrical seed box 20 having a cover 21. The seed box 20 is provided with a partition 22 which extends from its top to its bottom, the partition being secured in position by flanges 23 which are riveted in place. The partition 22 forms an annular space 24 which forms a compartment for receiving one kind of seed, while the remaining portion of the seed box may be filled with another kind of seed, such as corn, the space 24 being designed to receive smaller seed, such as soy beans. The compartment 24 is considerably smaller than the main compartment, due to the fact that it is not desired to plant as many seeds of soy beans in a hill as of corn.

The bottom plate 15 is provided with an annular slot 25 which communicates with the main compartment of the seed box. The plate is also provided with an annular slot 26 which communicates with the bottom of the auxiliary seed box 24.

Rotatively mounted beneath the bottom plate 15 is a seed plate 27 which is circular in formation and has its periphery provided with a series of notches 28. The plate 27 is provided with a row of seed pockets 31 which are supported beneath the annular slot 25. The plate is also provided with a row of seed pockets 32 supported beneath the slot 26. The center of the plate is provided with an opening 33 to be rotatively received on a downwardly projecting lug 34 from the central portion of the plate 15, said lug terminating in a slightly contracted portion 35 which is half semi-circular and half rectangular. Supported beneath the plate 27 is a bearing plate 36 provided with an opening 37 for receiving the contracted portion 35 of the lug 34. A bolt 38 is provided for securing said bearing plate in position, which in turn rotatively supports the said plate.

The under surface of the seed plate is provided with an annular rib 39 so that the pocket portion 31 is thicker than that portion carrying the pockets 32, said rib being designed to travel in an annular groove 40 in the upper surface of the bearing plate 36. The plate 36 is provided with an opening 41 which communicates with the spout 11. Said opening is also arranged to communicate with both rows of pockets 31 and 32 of the seed plate. That portion of the seed plate above the spout 11 is closed. Said closed portion including pivoted dogs 42 for forcing the seeds from the pockets 31 and 32. The closed portion is also provided with rakes 43 for striking off excess seeds from the pockets. The members 42 and 43 are of the usual construction.

The plates 27 and 36 are included in a ring 44 supported and carried by the seed plate 27. Lugs 45 on the ring 44 are designed to enter the notches 28 in the plate 36 and to support the ring 44 against downward movement and cause the said plate 27 to be rotated in unison therewith. The outer surface of the ring 44 is provided with teeth 46 designed to be engaged by a plunger 29 pivotally mounted to the upper end of an arm 30 secured to the shaft 12. These parts are of the usual construction, and arranged to impart an intermittent rotary movement to the plate 27, as the arm 30 is rocked.

By this arrangement it will be seen that seed corn may be placed in the main compartment of the seed box, while the auxiliary compartment may be filled with a different kind of seed, such as soy beans, and that as the seed plate is rotated, a predetermined number of seeds will enter the pockets 31 and also a predetermined number of seeds will enter the pockets 32.

That portion of the plate 27 supporting the pockets 32 is thinner to reduce the size of the pockets 32, on account of the beans being smaller in size than the grains of corn. As the plate is rotated, the seeds in each set of pockets will be delivered simultaneously to the dropping spout 11.

The number of seeds dropped in each hill is determined by the size of the openings in the plate 27, which plate may be easily and quickly changed if so desired, by releasing the thumb nut 19 and swinging the seed hopper to position where the bearing plate 36 is uppermost, after which the bolt 38 may be removed, permitting the plates 27 and 36, together with the ring 44, to be removed, after which a new seed plate may be placed in position having different size pockets.

Thus it will be seen that I have provided a seed dropping attachment for corn planters of simple, durable and inexpensive construction, and so arranged that no change is necessary to adapt it to plant a number of different kinds of seeds simultaneously. All that is necessary is that the seeds be placed in the various compartments.

I claim as my invention:

1. In combination, a planter runner frame having a dropping spout, a pair of upwardly projecting brackets carried by said frame, a seed box having a bottom plate pivotally mounted to one of said brackets, means for detachably securing the seed box to the other one of said brackets, said bottom plate being provided with a pair of annular grooves and having its central portion provided with a downwardly extending cylindrical lug, the lower end of said lug terminating in a contracted portion of angular formation, a seed plate rotatively mounted on the cylindrical portion of said lug, a bearing plate supported on the angular portion of said lug to support said seed plate, said bearing plate having an opening in communication with said spout, a bolt projected through the downwardly extending lug of said bottom plate to detachably connecting said bearing plate and said seed plate, a toothed ring rotatively mounted on the periphery of said bearing plate, means for detachably connecting said toothed ring and said seed plate, and means for engaging the teeth of said ring for intermittently rotating said seed plate.

2. In combination with a planter frame, a seed box having a bottom plate, means for pivotally mounting the bottom plate to said planter frame, said bottom plate having seed receiving openings and a downwardly projecting lug on its central portion, a seed plate pivotally mounted on said lug, a bearing plate detachably supported beneath said seed plate, a toothed ring rotatively mounted on said bearing plate, means for detachably connecting said toothed ring with said seed plate, and means for successively engaging the teeth of said ring to impart intermittent rotary motion to said seed plate.

Des Moines, Iowa, February 3, 1927.

RICHARD V. BARRY.